(12) United States Patent
Abt

(10) Patent No.: US 12,514,671 B2
(45) Date of Patent: Jan. 6, 2026

(54) ILLUMINATED CANNULA

(71) Applicant: Alcon Inc., Fribourg (CH)

(72) Inventor: Niels Alexander Abt, Winterthur (CH)

(73) Assignee: Alcon Inc., Fribourg (CH)

( * ) Notice: Subject to any disclaimer, the term of this patent is extended or adjusted under 35 U.S.C. 154(b) by 705 days.

(21) Appl. No.: 17/189,447

(22) Filed: Mar. 2, 2021

(65) Prior Publication Data

US 2021/0177540 A1  Jun. 17, 2021

Related U.S. Application Data

(63) Continuation of application No. 16/248,037, filed on Jan. 15, 2019, now abandoned.

(60) Provisional application No. 62/713,190, filed on Aug. 1, 2018, provisional application No. 62/626,325, filed on Feb. 5, 2018.

(51) Int. Cl.
| | | |
|---|---|---|
| *A61B 90/30* | (2016.01) | |
| *A61B 17/34* | (2006.01) | |
| *A61F 9/007* | (2006.01) | |
| *A61B 3/00* | (2006.01) | |
| *A61B 17/00* | (2006.01) | |
| *A61B 34/00* | (2016.01) | |
| *A61F 9/008* | (2006.01) | |

(52) U.S. Cl.
CPC .......... *A61B 90/30* (2016.02); *A61B 17/3421* (2013.01); *A61F 9/00736* (2013.01); *A61B 3/0008* (2013.01); *A61B 2017/00199* (2013.01); *A61B 34/25* (2016.02); *A61B 2090/304* (2016.02); *A61B 2090/306* (2016.02); *A61F 9/008* (2013.01)

(58) Field of Classification Search
CPC ...... A61B 17/3421–3423; A61B 90/30; A61B 2090/304
See application file for complete search history.

(56) References Cited

U.S. PATENT DOCUMENTS

| | | | |
|---|---|---|---|
| 3,764,796 A | 10/1973 | Gilliam et al. | |
| 3,774,022 A | 11/1973 | Dubrow et al. | |
| 3,819,925 A | 6/1974 | Richter et al. | |
| 3,933,118 A | 1/1976 | Lyons et al. | |
| 4,064,428 A | 12/1977 | Van Zandt | |
| 5,460,182 A * | 10/1995 | Goodman | A61B 5/0084 600/478 |
| 5,609,562 A * | 3/1997 | Kaali | A61B 1/3132 604/164.08 |
| 6,398,721 B1 * | 6/2002 | Nakamura | G02B 7/001 600/102 |

(Continued)

*Primary Examiner* — Eduardo C Robert
*Assistant Examiner* — Steven J Cotroneo
(74) *Attorney, Agent, or Firm* — Patterson + Sheridan, LLP

(57) ABSTRACT

Illumination of a cannula is disclosed herein. A cannula may include a cannula hub at a proximal end of the cannula. The cannula hub is operable to emit visible light. The cannula may further include a tube portion that extends from the cannula hub towards a distal end of the cannula. A surgical system may include a surgical console, a microscope communicatively coupled to the surgical console, and a cannula. The cannula may include a cannula hub at the proximal end of the cannula, and a tube portion that extends from the cannula hub towards a distal end of the cannula. The cannula hub is operable to emit visible light.

23 Claims, 8 Drawing Sheets

(56) References Cited

U.S. PATENT DOCUMENTS

| | | | | |
|---|---|---|---|---|
| 6,440,063 | B1* | 8/2002 | Beane | A61B 90/40 |
| | | | | 600/206 |
| 7,874,982 | B2* | 1/2011 | Selover | A61B 17/3421 |
| | | | | 600/199 |
| 2002/0022764 | A1* | 2/2002 | Smith | A61B 17/3421 |
| | | | | 600/102 |
| 2005/0182318 | A1* | 8/2005 | Kaji | A61B 5/06 |
| | | | | 600/424 |
| 2005/0279354 | A1* | 12/2005 | Deutsch | A61M 16/0463 |
| | | | | 128/200.24 |
| 2007/0100210 | A1* | 5/2007 | Selover | A61B 17/02 |
| | | | | 600/199 |
| 2012/0099077 | A1* | 4/2012 | Abt | B65D 75/22 |
| | | | | 351/219 |
| 2013/0204095 | A1* | 8/2013 | Mark | A61M 39/06 |
| | | | | 600/249 |
| 2015/0182716 | A1 | 7/2015 | Wolf et al. | |
| 2015/0265466 | A1* | 9/2015 | Bhadri | A61B 17/0231 |
| | | | | 600/249 |
| 2017/0231712 | A1* | 8/2017 | Vayser | A61B 1/046 |
| | | | | 348/68 |
| 2018/0140373 | A1* | 5/2018 | Dos Santos | A61B 90/20 |
| 2018/0338859 | A1* | 11/2018 | Mirsepassi | A61B 3/0008 |
| 2019/0046288 | A1* | 2/2019 | Anderson | A61B 17/0231 |

* cited by examiner

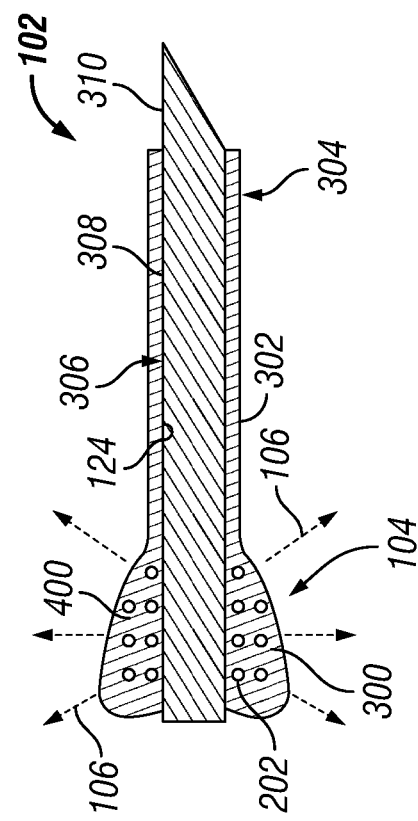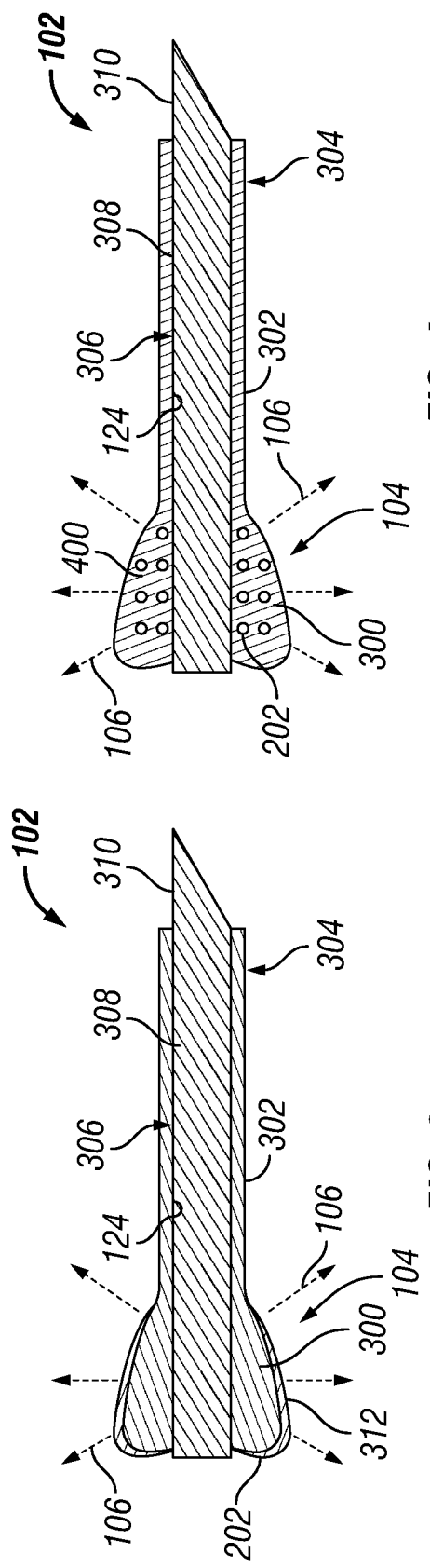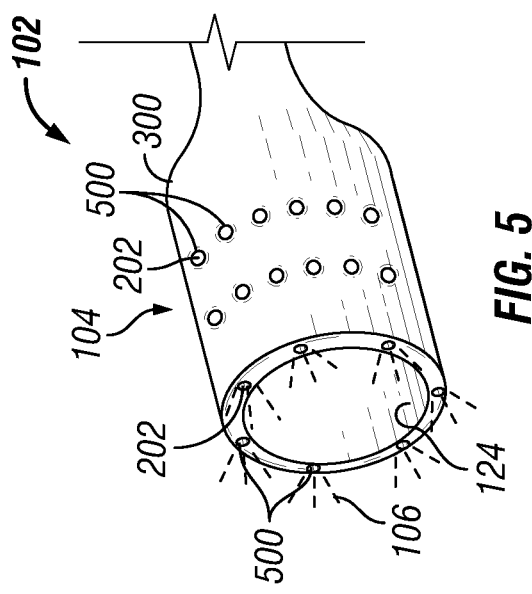

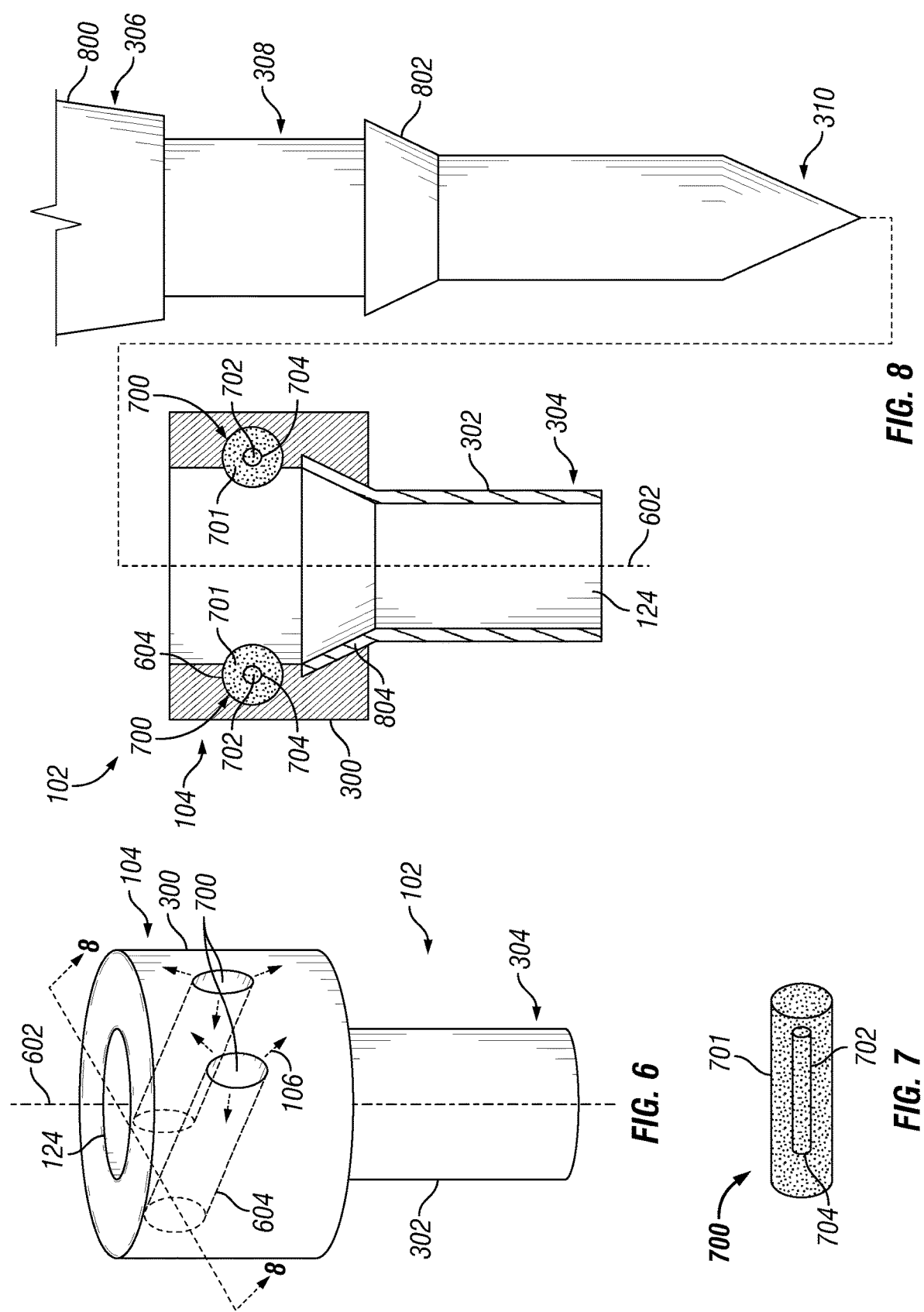

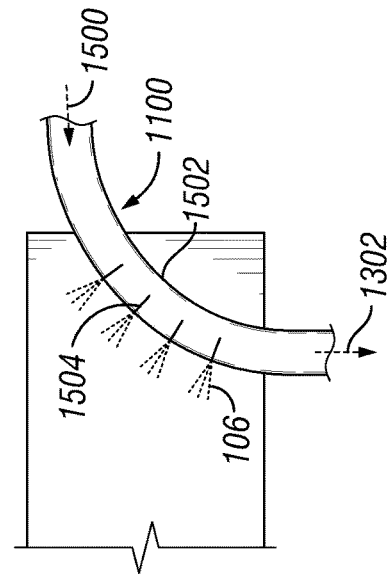
FIG. 15
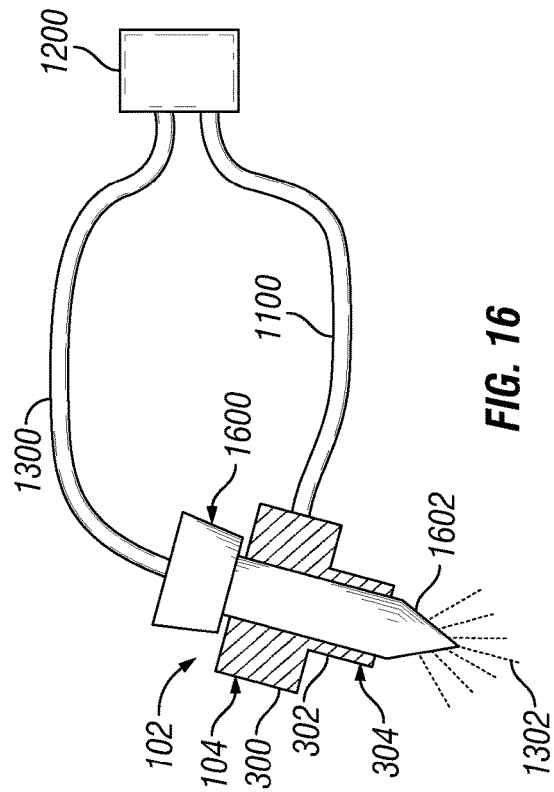
FIG. 16
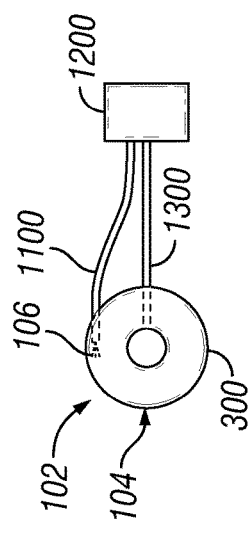
FIG. 13A
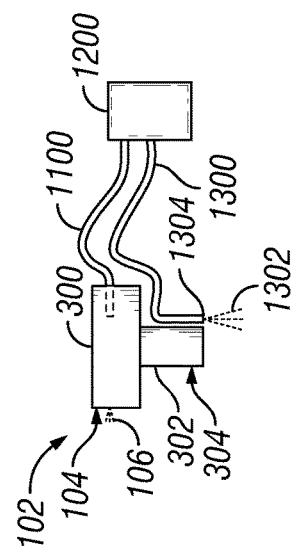
FIG. 13B
FIG. 14

ILLUMINATED CANNULA

CROSS-REFERENCE TO RELATED APPLICATIONS

This application:
a. is a continuation application of U.S. Non-Provisional patent application Ser. No. 16/248,037, filed Jan. 15, 2019, titled "Illuminated Cannula," whose inventor is Niels Alexander Abt,
b. claims the benefit of priority of U.S. Provisional Application Ser. No. 62/626,325, filed Feb. 5, 2018, titled "Illuminated Cannula," whose inventor is Niels Alexander Abt (U.S. Non-Provisional patent application Ser. No. 16/248,037 claimed the benefit of priority of U.S. Provisional Application Ser. No. 62/626,325), and
c. claims the benefit of priority of U.S. Provisional Application Ser. No. 62/713,190, filed Aug. 1, 2018, titled "Illuminated Cannula," whose inventor is Niels Alexander Abt (U.S. Non-Provisional patent application Ser. No. 16/248,037 claimed the benefit of priority of U.S. Provisional Application Ser. No. 62/713,190).

All three applications (U.S. Non-Provisional patent application Ser. No. 16/248,037, U.S. Provisional Application Ser. No. 62/626,325, and U.S. Provisional Application Ser. No. 62/713,190) are hereby incorporated by reference in their entirety as though fully and completely set forth herein.

BACKGROUND

The human eye can suffer a number of maladies causing mild deterioration to complete loss of vision. While contact lenses and eyeglasses can compensate for some ailments, ophthalmic surgery is required for others. Generally, ophthalmic surgery is classified into posterior segment procedures, such as vitreoretinal surgery, and anterior segment procedures, such as cataract surgery. Vitreoretinal surgery may address many different eye conditions, including, but not limited to, macular degeneration, diabetic retinopathy, diabetic vitreous hemorrhage, macular hole, detached retina, epiretinal membrane, and cytomegalovirus retinities.

In vitreoretinal surgery, the surgeon needs to be able to see the posterior segment to properly address the eye condition. However, undesirable light, such as glare and/or glistening, from the surgical field may impact visibility of the posterior segment of the eye. Currently, vitreoretinal surgeons can work in a darkened operating room to decrease concerns with the undesired light. Alternatively, the operating room may not be darkened, but the vitreoretinal surgeon may then have difficulty visualizing the posterior segment due to the undesired light. Access to the posterior segment in vitreoretinal surgery can be provided by one or more cannulas inserted into the eye.

SUMMARY

In an exemplary aspect, the present disclosure is directed to an illuminated cannula system. The illuminated cannula system may include a cannula that includes a cannula hub at a proximal end of the cannula and a tube portion extending from the cannula hub towards a distal end of the cannula. The cannula hub may be operable to emit visible light.

In another exemplary aspect, the present disclosure is directed to a surgical system. The surgical system may include a surgical console, a microscope communicatively coupled to the surgical console, and a cannula operable to emit visible light. The cannula may include a cannula hub disposed at a proximal end of the cannula and a tube portion that extends from the cannula hub towards a distal end of the cannula.

In another exemplary aspect, the present disclosure is directed to a method for light projection. The method may include inserting a cannula into an eye; emitting visible light from at least one luminescent material disposed at a proximal end of the cannula; and disposing a surgical instrument through the cannula.

The different aspects may include one or more of the following features. The cannula may include a lumen extending a long a longitudinal axis of the cannula. A trocar having a shaft portion and a blade portion may also be included. The trocar may be configured to be receivable into the lumen such that the blade portion of the trocar extends distally from the tube portion of the cannula. The cannula hub may include at least one luminescent material selected from the group consisting of a fluorescent material, a phosphorescent material, a chemiluminescent material, and a radioluminescent material. The at least one luminescent material may be disposed in the cannula hub, and the cannula hub may include a material that is transparent or translucent. The at least one luminescent material may be disposed in a coating that is deposited on the cannula hub. The cannula hub may include a container including a radioluminescent material and a fluorescent material, the radioluminescent material being operable to release electrons that interact with the fluorescent material to generate the visible light. The cannula hub may include a luminescent container disposed at the proximal end of the cannula. The luminescent container may include a first reactant and a second reactant. The second reactant may be disposed in an interior container disposed within the luminescent container. The interior container may separate the second reactant from the first reactant, and the first reactant and the second reactant are operable to react to emit the visible light when the first reactant and the second reactant are combined.

The cannula may include a lumen extending along a longitudinal axis of the cannula. A trocar may be received within the lumen of the cannula. The trocar may include a shaft portion and a blade portion. The trocar may extend through the lumen such that the blade portion extends distally from the tube portion of the cannula. The shaft portion of the trocar may include a shoulder portion that is engageable with the luminescent container extending into the lumen. The visible light may be provided to the cannula hub through an optical fiber.

The different aspects may also include one or more of the following features. The cannula may include a container disposed in the cannula hub. The container may include a radioluminescent material and a fluorescent material, the radioluminescent material being operable to release electrons that interact with the fluorescent material to generate the visible light. The cannula may include a luminescent container disposed in the cannula hub and an interior container. The interior container may be disposed within the luminescent container. A first reactant may be contained within the luminescent container, and a second reactant may be disposed in the interior container. The interior container may separate the second reactant from the first reactant, the first reactant and the second reactant being operable to react to emit the visible light. An ultraviolet light source may be operable to emit ultraviolet light at the cannula. The cannula hub may include a fluorescent material that emits the visible light in response to the ultraviolet light. A light source and an optical fiber coupled to the cannula and the light source may also be included. The optical fiber may be operable to carry the visible light form the light source to the cannula. Ultraviolet light may be directed at the proximal end of the cannula to cause the at least one luminescent material to emit the visible light. The at least one luminescent material may include a fluorescent material. The optical fiber may include a modification. The modification may cause a portion of light passing through the optical fiber to be transmitted through the modification and into the cannula hub. Emitting visible light from at least one luminescent material disposed in a proximal end of the cannula may include activating a luminescent container by removal of a trocar from the cannula.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

BRIEF DESCRIPTION OF THE DRAWINGS

These drawings illustrate certain aspects of some of the implementations of the present disclosure and should not be used to limit or define the scope of the disclosure.

FIG. 3 illustrates another example cannula with illumination, wherein the cannula includes a luminescent material.

FIG. 4 illustrates another example cannula with illumination, wherein the cannula includes a luminescent material.

FIG. 5 illustrates another example of a cannula with illumination, wherein the cannula includes a luminescent material.

FIG. 6 illustrates another example of a cannula with illumination, wherein the cannula includes chemiluminescent materials.

FIG. 7 illustrates an example of a luminescent container that holds chemiluminescent materials.

FIG. 8 illustrates a further example of a cannula with illumination, wherein the cannula includes a luminescent container including chemiluminescent materials, and also shows the corresponding trocar operable to interact with the luminescent container.

FIGS. 13A and 13B illustrate embodiment further example of a cannula with illumination, wherein light is provided to the cannula with an optical fiber and a separate optical fiber provides light in the eye.

FIG. 14 illustrates another example of a cannula with illumination, wherein light is provided to the cannula and into the eye with an optical fiber.

FIG. 15 is enlarged detail view of the optical fiber shown on FIG. 14.

FIG. 16 illustrates another example of a cannula with illumination, wherein light is provided to the cannula with an optical fiber and a separate optical fiber provides light in the eye.

DETAILED DESCRIPTION

Figure 1:
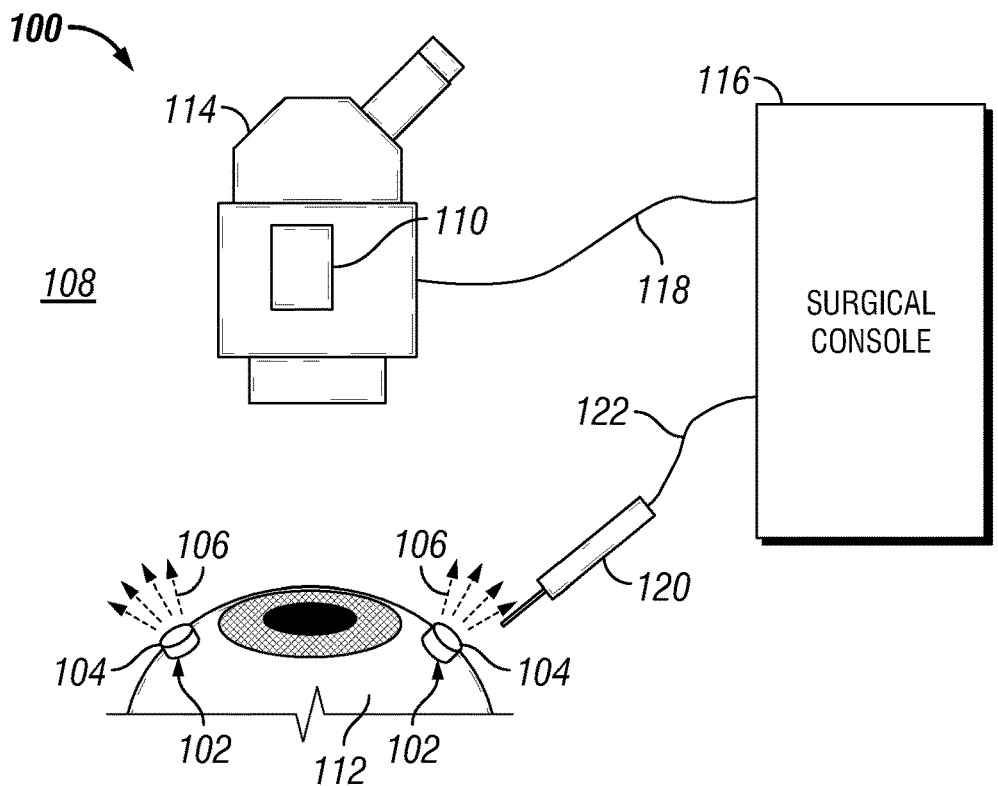
FIG. 1 illustrates an example surgical system that includes a cannula with illumination.

For the purposes of promoting an understanding of the principles of the present disclosure, reference will now be made to the implementations illustrated in the drawings and specific language will be used to describe them. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with reference to one or more implementations may be combined with the features, components, and/or steps described with reference to other implementations of the present disclosure. For simplicity, in some instances the same reference numbers are used throughout the drawings to refer to the same or like parts.

The example cannula illumination implementations described herein generally relate to eye surgery. More particularly, the example implementations generally relate to illumination of a proximal end of a cannula. While the cannula illumination may be beneficial in a number of different applications, illumination of a proximal end of a cannula may be particularly beneficial in a darkened operating room during vitreoretinal surgery. In some implementations, a source of visible light may illuminate the proximal end of a cannula. The source of visible light may be the cannula, as the visible light may be emitted from the cannula itself. In other instances, the source of visible light may be external to the cannula, such as from a surgical instrument. In some implementations, the proximal end of the cannula may be considered illuminated as a result of visible light being emitted from the proximal end of the cannula as opposed to light being projected onto the proximal end. In some implementations, the proximal end may include a cannula hub that is operable to emit the visible light. For example, a tube portion may extend from the cannula hub toward a distal end of the cannula. A number of different techniques are described herein for illumination of the cannula hub.

The visible light emitted from the cannula permits a user, such as a surgeon, located in a darkened operating environment the ability to readily locate the cannula, such as when the user desires to insert a surgical instrument into the cannula. As a result, the illuminated cannulas described herein allows a surgeon to avoid disruptive activities that take the surgeon's attention away from the surgical procedure at hand, such as requiring the surgeon to zoom out a microscope being used by the surgeon to view a surgical site; switch on a microscope light in order to visualize the proximal end of the cannula and the instrument; or, once the instrument is introduced into the cannula, switching off the microscope lights before returning the surgeon's attention to the procedure at hand. The cannulas described herein also avoid the time associated with readjustment of the microscope delays the vitreoretinal surgery.

FIG. 1 illustrates an example of a surgical system 100 for illumination of a cannula 102. As illustrated, the cannula 102 may include a proximal end 104 that emits visible light 106, for example, providing visualization of the cannula 102 in an operating room environment 108 that may, for example, be darkened. Implementations of the surgical system 100 may further include a camera 110 that can collect information on an eye 112 and a microscope 114 that is operable to visually inspect the eye 112. The surgical system 100 may also include a surgical console 116 that receives the information from the camera 110 and/or the microscope 114.

The camera 110 may be any camera operable to collect information about the eye 112. Example cameras 110, include, but are not limited to, CMOS and CCD color cameras; monochromatic cameras with a broad wavelength in the visible range; cameras operable to detect near infrared or cameras operable to detect a specified wavelength in visible-near-infrared range. The camera 110 may be in signal communication with the surgical console 116 in any number of ways, such as, for example a wired or wireless connection. For example, the information collected by the camera 110 may be sent to the surgical console 116 for further processing. In some implementations, the information collected by the camera 110 may be sent to the surgical console 116 through a communication line 118 that communicatively couples the camera 110 to the surgical console 116. As explained previously, the camera 110 may be in communication with the surgical console 116 in other ways. Thus, in other implementations, the camera 110 may be in wireless communication with the surgical console 116. Consequently, the communication line 118 may be eliminated. In some implementations, the camera 110 may be optimized for use in low light levels, such as during vitreoretinal surgery where the operating room environment 108 may be dark. In some implementations, the eye 112 may be illuminated with light outside of the visible spectrum and still detectable by the camera 110 so as to avoid disturbing the surgeon. In some implementations, the camera 110 may be mounted on the microscope 114, as shown. In other implementations, the camera 110 may be integrated into the microscope 114. For example, the cameral 110 may be built into the optical path of the microscope 114, such as, for example, with the use of a semi-transparent beam splitter. In some implementations, the camera 110 may receive information about the eye 112 and provide this information about the eye 112 to the surgical console 116.

The microscope 114 may be any microscope operable to visually inspect the eye 112, including, but not limited to, an ophthalmic surgical microscope or a stereo microscope, among others. A user, such as a surgeon or other medical professional, may operate the microscope 114 during surgery, for example, to visual the eye 112 (or specific portions thereof) in more detail. The microscope 114 may be in signal communication with the surgical console 116 via any number of connection methods, such as, for example, a wired or wireless connection. For example, the information collected by the microscope 114 may be sent to the surgical console 116 for further processing. In some implementations, the information collected by the microscope 114 may be sent to the surgical console 116 through the communication line 118 that communicatively couples the microscope 114 to the surgical console 116. In other implementations, the microscope 114 may be wirelessly connected to the surgical console 116 such that information is communicated wirelessly therebetween. In such instances, the communication line 118 may be omitted. While not shown, the microscope 114 may include additional equipment, including, but not limited to, a light source.

With continued reference to FIG. 1, the surgical system 100 also includes a surgical instrument 120. The surgical instrument 120 may include any instrument for use in the surgical procedure, including, but not limited to, an ophthalmic endoilluminator, a vitrectomy probe, forceps, scissors, a backflush, a soft tip cannula, a pic, and a scraper, among others. In some instances, the surgical instrument 120 couples to the surgical console 116 with a connection line 122. In some instances, the connection line 122 may provide power to the surgical instrument 120, data communication, or both. Power provided to the surgical instrument 120 may be in the form of electrical power, pneumatic power, hydraulic power, of in some other form. In other implementations (not shown), the surgical instrument 120 is not coupled to the surgical console 116. Thus, in some instances, the connection line 122 may be omitted.

As illustrated in the example of FIG. 1, one or more cannulas 102 may be disposed in the eye 112. FIG. 1 shows two cannulas 102 disposed in the eye. However in other implementations, additional or fewer cannulas 102 may be disposed in the eye.

With the cannula 102 disposed in the eye 112, the proximal end 104 of the cannula 102 extends from the eye 112. The cannula 102 provides access into the interior of the eye 112. For example, the cannula 102 includes a lumen through which an instrument, such as the surgical instrument 120 or a different instrument, may be inserted to access the interior of the eye 112. The proximal end 104 of the cannula 102 may be operable to emit visible light 106. As indicated above, while the present illustration shows two cannulas 102 disposed in the eye 112, it should be understood that one, two, three, four, or more cannulas 102 may be used as desired by one of ordinary skill the art for a particular application. In some implementations, the cannula 102 may be a trocar cannula, an infusion cannula, or other desired cannula for use in the eye surgery.

In operation, the surgical instrument 120 may be inserted into the eye 112 through the cannula 102. However, as previously described, the operating room environment 108 may be darkened, for example, so that ambient light in the operating room environment 108 does not interfere with visualization through the microscope 114. Consequently, with the operating room environment 108 in a darkened condition, inserting the surgical instrument into cannula 102 may be challenging. In some implementations, the proximal end 104 of the cannula 102 may be operable to emit visible light 106, thus allowing visualization (or improved visualization) of the proximal end 104, even in the darkened condition of the operating room environment 108, so that the surgical instrument 120 can be inserted into the cannula 102. Thus, cannulas within the scope of the present disclosure are constructed and operable to emit visible light so that a user can more easily locate the cannula and a proximal end thereof in a darkened environment and insert an instrument into and through the cannula.

Figure 2:
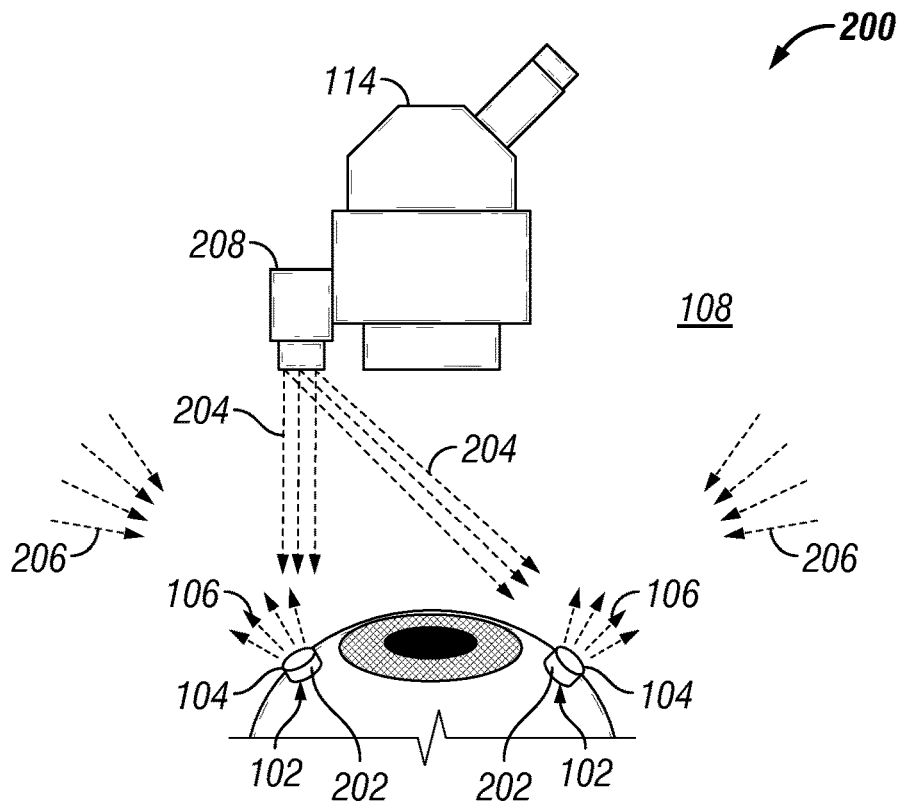
FIG. 2 illustrates an example surgical system that includes a cannula with illumination, wherein the cannula includes a luminescent material.

FIG. 2 is a schematic illustration of another example surgical system 200 used to explain an example technique for illumination of the proximal end 104 of the cannula 102. In the examples described below, the proximal end 104 of the cannula 102 is described as having a luminescent material included therewith or applied thereto. However, the scope of the disclosure is not so limited. Rather, in other implementations, one or more luminescent materials may be added to other parts of the cannula 102 or to an entirety of the cannula 102. Further, a luminescent material may be included with or applied to other types of medical instruments used in a surgical procedure to permit the instruments to be readily visible in a darkened surgical environment without disrupting a surgeon or other medical professional participating in the surgical procedure.

As illustrated in FIG. 2, the proximal end 104 of the cannula 102 may include or have applied thereto luminescent materials 202 as a source of visible light 106. Example luminescent materials 202 include materials that exhibit luminescence, for example, by emitting light through fluorescence, phosphorescence, chemiluminescence, or radioluminescence. Examples of luminescent materials 200 within the scope of the present disclosure include, but are not limited to, fluorescent materials, phosphorescent materials, chemiluminescent materials, and radioluminescence materials. Some example fluorescent materials and phosphorescent materials within the scope of the present disclosure exhibit luminescent by emitting the visible light 106 after absorption of light.

In some implementations, the luminescent materials 202 may include fluorescent materials that emit the visible light 106 after absorption of light in the ultraviolet spectrum (e.g., UV light 204). By emission of the visible light 106 from the luminescent materials 202 that includes one or more fluorescent materials, the proximal end 104 of the cannula 102 may be visualized during the surgery. In some implementations, the luminescent materials 202 may include phosphorescent materials that emit the visible light 106 relatively slowly (as compared to fluorescent materials) after exposure to charging light 206. One or more phosphorescent materials may be added or applied to the proximal end of the cannula 102 such that the proximal end 104 may be made visible during a surgical procedure.

Natural or artificial light, such as natural or artificial light present within the operating room environment 108, may be used to charge luminescent materials (either fluorescent or phosphorescent) so as to cause the luminescent materials 202 to emit visible light. This natural or artificial light that may be used solely or in part to charge the luminescent materials 202 may be present in the operating room environment 108 prior to darkening of the operating room environment 108. When the operating room environment 108 is in a darkened condition, the luminescent materials 202 emit the visible light 106 such that the proximal end 104 of the cannula 102 is visible during the surgery.

In some implementations, the luminescent materials 202 may include chemiluminescent materials that emit the visible light 106 as a result of a chemical reaction. The luminescent materials 202 in the form of one or more chemiluminescent materials may be applied to or included in the proximal end 104 of the cannula 102 and allowed to react such that the visible light 106 is emitted thereby. The visible light 106 emitted by the chemiluminescent material permits the proximal end 104 of the cannula 102 to be visible to a user in a darkened operating room environment 108 during a surgical procedure.

In some implementations, the luminescent materials 202 may include radioluminescent materials that emit the visible light 106 as a result of ionizing radiation, such as alpha particles, beta particles, or gamma rays. An example of a radioluminescent material within the scope of the disclosure includes tritium, which may be used in combination with a phosphor material. In some implementations, tritium may release electrons that interact with the phosphor material to generate fluorescent light. Similar to the other examples describe herein, the tritium in combination with a phosphor material may be applied to or included with the proximal end 104 of the cannula 102.

The example surgical system 200 shown on FIG. 2 may also include an ultraviolet light source 208. The ultraviolet light source 208 may be a black light, a short-wave ultraviolet light, gas-discharge lamp, and ultraviolet light emitting diode, or another light source operable to emit ultraviolet radiation. The ultraviolet light source 208 may be used, for example, when the luminescent materials 202 include the fluorescent materials. The UV light 204 emitted by the ultraviolet light source 208 is absorbed by the luminescent materials 202, causing the luminescent materials 200 to emit the visible light 106. The ultraviolet light source 208 may be disposed at any position in the operating room environment 108 where the UV light 204 may impinge upon the proximal end 104 of the cannula 102. In the illustrated example of FIG. 2, the ultraviolet light source 208 is attached to the microscope 114. The ultraviolet light source 208 may be attached to the microscope 114 in any manner, including an adhesive, a fasteners, magnets, hook and loop fasteners, or any other manner operable to attach the ultraviolet light source to the microscope 114. In other instances, the ultraviolet light source 208 may be integrated into the microscope 114. In still other instances, the ultraviolet light source 208 may be disposed on or incorporated into another piece of equipment or provided as a separate piece of equipment within the operating room environment 108.

FIG. 3 illustrates an example cannula 102 in which a trocar 306 is inserted within a lumen 124 defined by the cannula 102. The proximal end 104 of the cannula 102 includes the luminescent material 204 as a source of the visible light 106. As illustrated, the proximal end 104 of the cannula 102 includes a cannula hub 300 and a tube portion 302 extending from the cannula hub 300 towards a distal end 304 of the cannula 102. As illustrated, the trocar 306 is extends through the lumen 124 of the cannula 102. The trocar 306 includes a shaft portion 308 and a blade portion 310. The blade portion 310 extends distally from the shaft portion 308. With the cannula 102 and trocar 306 assembled as shown in FIG. 3, the blade portion 310 may be used to pierce an eye and the assembly advanced into the eye until, for example, the cannula hub 306 abuts the exterior surface of the eye. Thereafter, the trocar 306 may be removed from the cannula 102, leaving the cannula 102 resident in the eye such that the lumen 124 provides a passage through which a surgical device may be inserted into and recovered from the eye.

The luminescent material 202 is included in the proximal end 104 of the cannula 102. In the example shown on FIG. 3, a coating 312 of the luminescent material 202 may be applied onto an outer surface of the proximal end 104. By way of example, the coating 312 may be disposed on the cannula hub 300. Non-limiting examples of the coating 312 include, but are not limited to, a paint, a sleeve, or other covering that may be applied onto a surface of the cannula 102. In other implementations, the luminescent material 202 in the form of a coating may be disposed on other portions of the cannula 102, either alone or in combination with those disposed in the cannula hub 300.

FIG. 4 illustrates another example of the cannula 102. As shown, a trocar 306 extends through a lumen 124 defined by the cannula 102. The proximal end 104 includes the luminescent material 202 as a source of the visible light 106. The proximal end 104 of the cannula 102 includes a cannula hub 300 and a tube portion 302 that extends from the cannula hub 300 towards a distal end 304 of the cannula 102. The trocar 306 includes a shaft portion 308 and a blade portion 310. The assembly of the cannula 102 and the trocar 306 functions similarly to that described above in FIG. 3 in that the cannula 102 and trocar 306 may be used together to pierce and provide a passage into an interior of an eye.

In the example shown in FIG. 4, the luminescent material 202 is included in the cannula hub 300 at the proximal end 104 of the cannula 102. Particularly, the luminescent material is embedded in the cannula hub 300. In some instance, the luminescent material 202 may be disposed entirely within (i.e., encased by) an interior portion 400 of the cannula hub 300. That is, in some implementations, some or all of the luminescent material 202 may be encased within the interior portion 400.

The luminescent material 202 may be in the form of nodules or spheres embedded within the cannula hub 300. In other instances, the luminescent material 202 may be in the form of a continuous or discontinuous strip embedded within the proximal end 104, such as the cannula hub 300. In still other instance, the luminescent material 202 may have any desired shape, including, but not limited to, ovular, discus, platelet, toroidal, polygonal, and rod-like. The cannula hub 300 may be translucent or transparent to allow the visible light 106 from the luminescent material 202 to be emitted through the cannula hub 300 and released into the environment. In other implementations, the luminescent material 202 in the form of nodules, spheres, or strips, may be disposed in other portions of the cannula 102, either alone or in combination with those disposed in the cannula hub 300.

FIG. 5 illustrates another example of the cannula 102 in which the proximal end 104 includes containers 500 that contain the luminescent material 202 to provide visible light 106 in a darkened operating environment. The containers 500 may be disposed on or at least partially in the cannula hub 300. For example, one or more of the containers 500 may be disposed on the exterior surface of the cannula hub 300. In some instances, an exterior surface of the containers 500 may be flush with the exterior surface of the cannula hub 300 so that the exterior surface of the proximal end 104 is continuous. In other instances, one or more of the containers 500 may be raised relative to the exterior surface of the cannula hub 300. In other implementations, the containers 500 may be provided in other portions of the cannula 102, either alone or in combination with the cannula hub 300. Otherwise, the cannula 102 may be similar to the cannulas described above in reference to FIGS. 3 and 4. Thus, the cannula 102 shown in FIG. 5 may be used in combination with a trocar, which may be similar to trocar 306, to pierce an eye and provide a passage between the interior of the eye and the exterior of the eye.

With continued reference to FIG. 5, because some or all of the containers 500 are either located on an exterior surface of the cannula 102 or extend through the exterior surface of the cannula 102, the material forming the cannula 102 (or the portion of the cannula 102 that includes the containers 500) need not be transparent or translucent. However, the material forming the cannula 102 or a portion thereof may be transparent or translucent.

Non-limiting examples of the container 500 include vials, such as plastic or glass, that contain the luminescent material 202. In some implementations, the luminescent material 202 may include one or more radioluminescent materials, such as tritium, and a fluorescent material, such as a phosphor material. As explained above, the tritium may release electrons that interact with the phosphor material to generate the visible light 106 emitted from the proximal end 104.

FIG. 6 illustrates another example of the cannula 102 that may similar to the cannulas described above with respect to FIGS. 3-5. For example, the cannula 102 includes a proximal end 104, a cannula hub 300, a tube portion 302, a distal end 304, and a lumen 124 than extends along a longitudinal axis 602 of the cannula 102. However, the cannula 102 shown in FIG. 6 includes a luminescent material 202 is in the form of a chemiluminescent material.

FIG. 7 shows a luminescent container 700 that contains a chemiluminescent material. The example luminescent container 700 contains an arrangement of a first reactant 701 and a second reactant 702. In the illustrated example, the first reactant 701 surround the second reactant 702. However, the arrangement of the first and second reactants 701 and 702 shown in FIG. 7 is merely one possible arrangement, and other arrangements of the first reactant 701 and second reactant 702 are within the scope of the present disclosure. When the first reactant 701 and second reactant 702 of the luminescent arrangement 700 mix, a chemiluminescence reaction occurs so as to emit visible light.

To separate the first reactant 701 and the second reactant 702, the second reactant 702 may be disposed in an interior container 704. In operation, the combination of the first reactant 701 and the second reactant 702 may be combined at any desired time so that the visible light is emitted for visualization of the cannula 102. For example, the first reactant 701 and the second reactant 702 may be mixed just prior to placement of the cannula 102 during surgery or after placement of the cannula 102, but prior to darkening of an operating room environment, such as the operating room environment 108 discussed above. The moment when the first reactant 701 and the second reactant 702 are combined may depend on, for example, the particular luminescent materials chosen, the duration of time the combined reactants 701, 702 will emit visible light, and the expected duration of the surgical procedure. The first reactant 701 and the second reactant 702 may be combined in any way operable to generate the visible light 106. The interior container 704 may be made from a material that is more fragile than the luminescent container 700 so that when the luminescent container 700 undergoes a selected level of stress, the interior container 704 may break to release the second reactant 702 for contact with the first reactant 700 while leaving the luminescent container 700 unbroken.

In some instances, the luminescent container 700 may be made from any material operable to provide resistance to fracture under a defined stress level or loading. Example materials include, but are not limited to, glass, plastics (such as, for example, polyethylene, polycarbonate, polyethylene terephthalate, polytetrafluoroethylene, polyamide, and poly (methyl acrylate)), or other materials that are solid at room temperatures, such as gelatins. The luminescent container 700 may be translucent or transparent, for example, to allow the visible light 106 from the chemiluminescence reaction to be emitted through the luminescent container 700. The interior container 704 may also be made from, for example, glass, brittle plastics (such as polyethylene terephthalate, poly(methyl acrylate), and polystyrene), or other materials that are solid at room temperatures. However, in the case of the interior container 704, the material forming the interior container 704, the physical characteristics (e.g., shape, wall thickness, etc.) may be selected so as to fracture and release the contents thereof at the defined stress level or loading that would otherwise leave the luminescent container 700 unbroken.

The cannula hub 300 of the cannula 102 shown in FIG. 6 may be translucent or transparent, for example, to allow the visible light 106 from the chemiluminescence reaction to be emitted through the cannula hub 300. The cannula hub 300 includes cavities 604 in which a luminescent arrangement 700 may be disposed. Particularly, in some implementations, each of the cavities 604 may receive one of the luminescent arrangements 700. Although two cavities 604 are shown, other implementations may include additional or fewer cavities 604. The luminescent containers 700 are sources of visible light 106 for illumination of the cannula 102. When the chemiluminescent material is activated (e.g., by fracturing of the interior container 704 so that the first reactant 701 and the second reactant 702 mix), visible light 106 is emitted from the luminescent arrangements 700 so as to illuminate the cannula 102.

FIG. 8 illustrates a cross-sectional view of the cannula 102 of FIG. 6 taken along line 8-8. FIG. 8 also shows a side view of an example trocar 306 insertable into the cannula 102. As illustrated, the cannula 102 includes a proximal end 104 with a cannula hub 300 and a tube portion 302 that extends from the cannula hub 300 toward a distal end 304 of the cannula 102. The cannula 102 also includes a lumen 124 that extends along longitudinal axis 602 of the cannula 102. In the illustrated example, luminescent containers 700 are shown disposed in cavities 604 in the cannula hub 300. Although FIG. 8 shows two luminescent containers 700, other implementations may include fewer or additional luminescent containers 700.

As illustrated, the luminescent containers 700 disposed in the cavities 604 in the cannula hub 300 protrude into the lumen 124. As previously described the luminescent containers 700 each hold a first reactant 701 and a second reactant 702. As also described above, the second reactant 702 may be disposed in an interior container 704, the interior container 704 disposed within the luminescent container 700. The interior container 704 forms a barrier between the first reactant 701 and the second reactant 702 and prevents premature mixing of the first reactant 701 and the second reactant 702.

The trocar 306 is insertable into the lumen 124 defined by the cannula 102. As shown, the example trocar 306 includes a trocar hub 800, shaft portion 308, and a blade portion 310. The shaft portion 308 extends between the trocar hub 800 and the blade portion 310. As illustrated, the shaft portion 308 includes an enlarged portion in the form of shoulder portion 802. The shoulder portion 802 is configured to abut corresponding seat portion 804 in cannula hub 300. The shoulder portion 802 and seat portion 804 cooperate to limit an amount by which the trocar 306 is permitted to be inserted into the lumen 124 of the cannula 102 when the trocar 306 is disposed in the cannula 102.

In some implementations, movement of the trocar 306, while disposed in the lumen 124, relative to the cannula 102 (e.g., insertion of the trocar 306 into or removal of the trocar 306 from the cannula 102) may cause the trocar 306 to engage the luminescent containers 700. This engagement of the trocar 306 with the luminescent containers 700 may cause the first reactant 701 and the second reactant 702 to combine or mix (such as by fracture of the interior container 704 that contains the second reactant 702). For example, with the trocar 306 disposed in the lumen 124 of the cannula 102, removal of the trocar 306 from the cannula 102 the trocar 306 may interact with or otherwise disrupt the luminescent containers 700 to cause the first reactant 700 and the second reactant 702 to combine and generate light. In some instances, this interaction or disruption may case the interior container 704 to fracture or bust, releasing the second reactant 702 so as to combine with the first reactant 701.

For example, withdrawal of the trocar 306 from the cannula 102 may cause the shoulder portion 802 of the trocar 306 to engage the luminescent containers 700. In some implementations, this engagement may cause breakage of the interior containers 704, as the interior containers 704 may be more fragile than the luminescent containers 700, such that the first reactant 700 contacts and mixes with the second reactant 702 to generate light. It should be understood that FIGS. 6-8 illustrate one technique for illuminating the proximal end 104 of the cannula 102 using a chemiluminescence reaction and that other configurations of the cannula 102 and trocar 306 may be used to achieve the desired chemiluminescence reaction.

Figure 9:
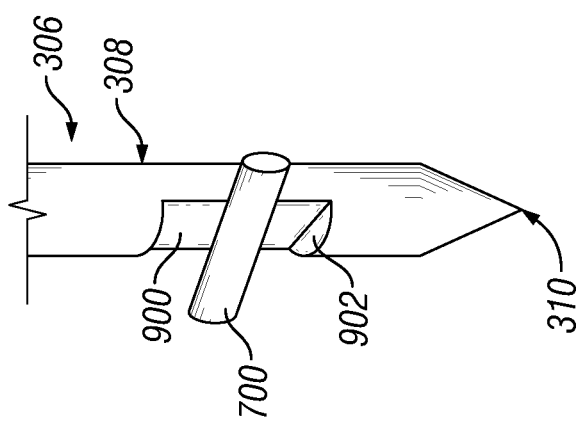
FIG. 9 illustrates an example of a trocar that interacts with the luminescent container holding the chemiluminescent materials.

FIG. 9 illustrates another example configuration of the trocar 306 that may be used with the luminescent containers 700 to produce a chemiluminescent reaction in response to movement of a trocar relative to a cannula. For the sake of clarity, the cannula 102 is not shown on FIG. 9 and a single luminescent container 700 is shown. As illustrated, the trocar 306 includes a shaft portion 308 and a blade portion 310 that extends distally from the shaft portion 308. In the illustrated example, the shaft portion 308 includes a cutout or notch 900 that forms a ledge 902. In operation, movement of the trocar 306 relative to the cannula and, more particularly, to the luminescent container 700 (e.g., by removal of the trocar 306 from the cannula or insertion of the trocar 306 into the cannula) activates the chemiluminescence reaction in the luminescent container 700 such as by fracturing an interior container 704 within the luminescent container 700 to cause a first reactant to mix with a second reactant and produce light.

Figure 10:
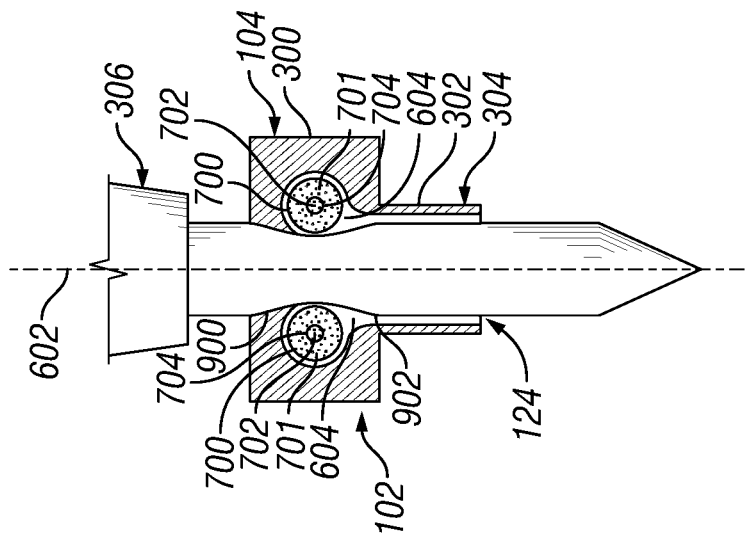
FIG. 10 illustrates another example of a cannula with illumination, wherein the cannula includes chemiluminescent materials.

FIG. 10 is an example that illustrates the trocar 306 of FIG. 9 disposed in a cannula 102. As illustrated, the cannula 102 includes a proximal end 104 with a cannula hub 300 and a tube portion 302 that extends from the cannula hub 300 toward a distal end 304 of the cannula 102. The cannula 102 also includes a lumen 124 that extends along longitudinal axis 602 of the cannula 102. In the illustrated example, luminescent containers 700 (two in this example, although additional or fewer luminescent containers 700 are within the scope of the disclosure) are shown disposed in cavities 604 in the cannula hub 300. As illustrated, the luminescent containers 700 protrude, at least partially, into the lumen 124.

The trocar 306 is illustrated as residing within the lumen 124 of the cannula 102. In this example also, a shaft portion 308 of the trocar 306 includes notches 900 that define ledges 902. However, in the example shown in FIG. 10, the notches 900 have a smoother contour than those shown in FIG. 9. The ledges 902 are configured to interact with the adjacent luminescent containers 700. As previously described the luminescent containers 700 each hold a first reactant 701 and a second reactant 702. The second reactant 702 may be disposed in an interior container, such as interior container 704 described above. The interior container 704 is disposed in the luminescent container 700 to prevent premature mixing of the first reactant 701 and the second reactant 702.

With continued reference to FIG. 10, movement of the trocar 306 may cause the trocar to engage the luminescent containers 700 such that combination of the first reactant 701 and the second reactant 702 occurs. For example, the cannula 102 may be provided with the trocar 306 received within the lumen 124 of the cannula 102. When the trocar 306 is removed from the cannula 102, the trocar 306 interacts with the luminescent containers 700 to cause the first reactant 701 and the second reactant 702 to combine. For example, the withdrawal of the trocar 306 may cause the ledge 902 formed by the notch 900 to engage the luminescent containers 700. In some implementations, this engagement may cause breakage of the interior containers 704, as the interior containers 704 may be more fragile than the luminescent containers 700, resulting in a chemiluminescent reaction and production of visible light.

Assembly of a trocar (which may be similar to one or more of the trocars 306 described herein), a cannula (which may be similar to one or more of the cannulas 102 described herein), and a luminescent container (which may be similar to one or more of the luminescent containers 700 described herein) may be performed such that insertion of the trocar into the cannula prevents activation of the luminescent container (e.g., by the fracture of an interior container to cause a first reactant and a second reactant to mix to generate light). For example, in some implementations, one or more luminescent containers may be inserted or otherwise coupled to the cannula after insertion of the trocar thereinto. As a consequence, the trocar engages the one or more luminescent containers only when the trocar is withdrawn from the cannula, thereby causing activation of the one or more luminescent containers to produce light.

In other implementations, one or more luminescent containers may be installed in the cannula before the trocar is inserted thereinto without activating the one or more luminescent containers. For example, the trocar may be formed such that the trocar is able to pass by the luminescent container while being inserted into the cannula without activating the luminescent container. However, withdrawal of the trocar from the cannula disrupts the luminescent container such that the luminescent container activates and produces light. For example, the trocar may include a feature having a contour that gradually engages the luminescent container when the trocar is inserted into the cannula but otherwise prevents activation of the luminescent container. However, the features of the trocar may abruptly engage the luminescent container when the trocar is removed from the cannula, causing the luminescent container to activate (e.g., by fracturing an interior container to cause a first reactant and a second reactant to mix and produce light).

Figure 11:
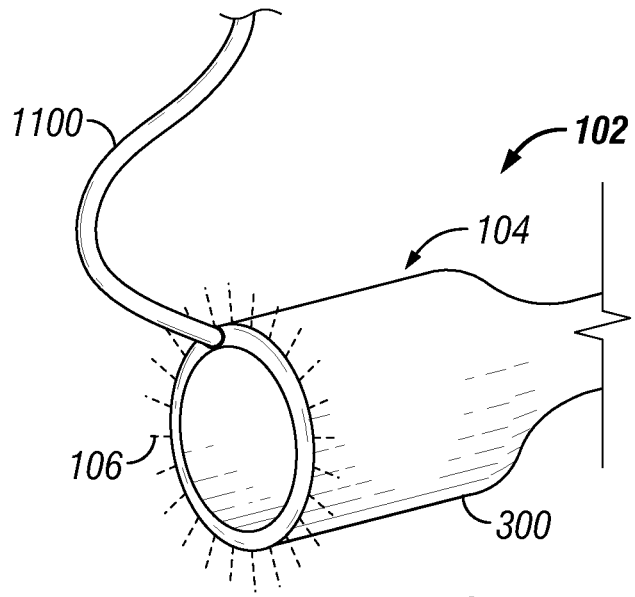
FIG. 11 illustrates another example cannula with illumination, wherein light is provided to the cannula with an optical fiber.
Figure 12:
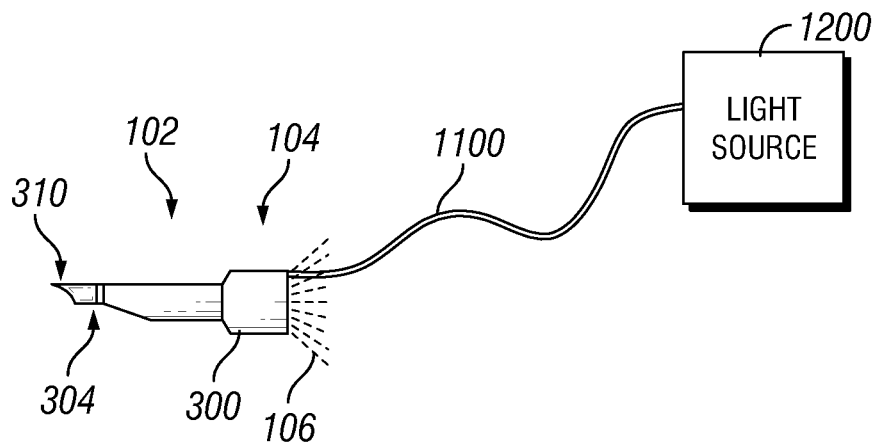
FIG. 12 illustrates another example cannula with illumination, wherein light is provided to the cannula with an optical fiber.

FIG. 11 shows a proximal end 104 of another example of the cannula 102. In this illustrated example, the proximal end 104 emits visible light 106 that is transmitted to the proximal end 104 via an optical fiber 1100. The optical fiber 1100 is coupled to the proximal end 104 of the cannula 102. With reference to FIG. 12, the optical fiber 1100 is coupled to a light source 1200 that is remote from the cannula 102. The optical fiber 1100 optically couples the light source 1200 to the cannula 102. As illustrated, the optical fiber 1100 extends from the light source 1200 and connects to the cannula hub 300.

The visible light 106 travels from the light source 1200, through the optical fiber 1100, to the cannula 102, and is emitted from the proximal end 104. As described above, the emitted visual light 106 permits the cannula 102 to be visible to a user in in an environment with low ambient light levels, such as a darkened operating room environment during a surgical procedure.

In some implementations, the visible light 106 may be emitted from the cannula hub 300. In some implementations, the cannula hub 300 may be translucent or transparent, to allow the visible light 106 transmitted by the optical fiber 1100 to be emitted through the cannula hub 300. In some implementations, the cannula hub 300 may be made from a semi-transparent material with or without one or more diffusing additives. The diffusing additives may be distributed within the cannula hub 300 to provide uniform illumination of the entire cannula hub 300.

The light source 1200 may be any light source including, but not limited to, a light-emitting diode (LED) light source, a phosphor light source, laser light source, halogen light source, xenon light source, or Mercury Vapor light source. Non-limiting examples of laser light sources include monochromatic (e.g., infrared, visible), multi-spectral, or super-continuum white lasers. The optical fiber 1100 carries the visible light 106 from the light source 1200 to the cannula 102. The optical fiber 1100 may be any optical fiber operable to transmit light, including, but not limited to, optical fibers made from glass or plastic.

FIGS. 13A and 13B illustrate another example in which optical fiber 1100 transmits visible light to the cannula 102 so that the cannula 102 becomes illuminated and visible in a darkened environment. FIG. 13A is a top view of the cannula 102, and FIG. 13B is a side view of the cannula 102. As illustrated, the cannula 102 includes a cannula hub 300 at proximal end 104 thereof and a tube portion 302 that extends from the cannula hub 300 towards a distal end 304 of the cannula 102.

As illustrated, an optical fiber 1100 is coupled to a lights source 1200 at a first end and is coupled to the cannula hub 300 at a second end. The optical fiber 1100 transmits light (in the form of visible light 106) from the light source 1200 to the cannula 102. The visible light 106 is emitted from the hub 300 so that the cannula 102 may be visible in a darkened or low ambient light level environment, such as, for example, an operating room environment. In some implementations, the cannula hub 300 may be translucent or transparent, for example, to permit passage of the visible light 106 from the optical fiber 1100 out of the cannula hub 300. In some implementations, the cannula hub 300 may be made from a semi-transparent material with or without one or more diffusing additives. The diffusing additives may be distributed within the cannula hub 300 to provide uniform illumination of the entire cannula hub 300.

An additional optical fiber 1300 extends from the light source 1200 to the cannula 102. The optical fiber 1300 is coupled to the light source 1200 as a first end. The light fiber extends along an exterior surface of a tube portion 302 of the cannula 102. A distal end 1304 of the optical fiber 1300 is be disposed adjacent to the distal end 304 of the cannula 102, as shown in FIG. 13B. In some instances, the distal end 1304 of the optical fiber 1100 may be aligned with the distal end 304 such that the optical fiber 1100 does not extend distally beyond the distal end 304 of the cannula 102.

Visible light provided by light source 1200 is transmitted through the optical fiber 1300 and emitted from the distal end 1304 in the form of visible light 1302. The visible light 1302 provides illumination to an interior of an eye when the cannula 102 is disposed in the eye. Although not shown on FIGS. 13A and 13B, in some instances, the optical fiber 1100 and the optical fiber 1300 may be bundled together. Further, in some implementations, the bundled optical fibers 1100 and 1300 may include a beam splitter. The beam splitter is operable to guide a portion of the visible light 106 generated by the light source 1200 into the optical fiber 1100 and also guide a portion of the visible light 106 generated by the light source 1200 into the optical fiber 1300. The portion of the visible light 106 transmitted through the optical fiber 1100 is conveyed to the cannula hub 300, while the portion of the visible light 106 transmitted through the optical fiber 1300 is conducted to the distal end 1304 and emitted therefrom. While only a single light source 1200 is shown on FIGS. 13A and 13B, it is within the scope of the disclosure that multiple lights sources may be used. For example, in some instances, a first light source may be used to generate light for transmission through the optical fiber 1100, and a second light source may be used to generate light for transmission through the optical fiber 1300.

FIG. 14 illustrates another example cannula 102 in which a single optical fiber 1100 is used to provide illumination to both a cannula and to an interior of an eye. In the illustrated example, visible light generated by light source 1200 is introduced into and transmitted along optical fiber 1100. The optical fiber 1100 is coupled to the hub 300 and releases a portion of the visible light into the hub 300. This portion of the visible light, i.e., visible light 106, is emitted from the hub 300 so that the cannula 102 is visible, such as in an environment having low ambient light (e.g., a darkened operating environment). A portion of the visible light passing through the optical fiber 1100 continues therealong until being released from the distal end 1400 of the optical fiber 1100. This portion of the visible light, i.e., visible light 1302, provides illumination, such as to an interior of an eye when the cannula 102 is inserted into the eye. As shown, the distal end 1400 of the optical fiber 1100 may be adjacent to the distal 304 of the cannula. In some instances, the distal end 1400 of the optical fiber 1100 may be aligned with the distal end 304 such that the optical fiber 1100 does not extend distally beyond the distal end 304 of the cannula 102.

FIG. 15 is a detail view of an interface between the optical fiber 1100 and the hub 300 of the cannula shown on FIG. 14 taken along circle 15. As illustrated, light 1500 traveling along the optical fiber 1100 is transmitted into the hub 300 via a plurality of defects or modifications 1504 formed or introduced into the optical fiber 1100. For example, the modifications 1504 may be formed or introduced into a cladding of the optical fiber 1100 and operate to permit some of the light traveling through the optical fiber 1100 to escape at the modifications 1504. This portion of the light 1500 that is transmitted into the hub 300 is emitted from the hub 300 as visible light 106. The remainder of the light 1500 is transmitted along the remainder of the optical fiber 1100 where the light 1500 is emitted from the distal end 1400, as shown in FIG. 14.

The optical fiber 1100 includes a cladding 1502. A portion of the light 1500 traveling along the optical fiber 1100 may be emitted as visible light 106 through the cladding 1502. In some instances, the cladding 1502 may be modified, such as during production of the optical fiber 1100 or some time thereafter, to include the plurality of modifications 1504. Numerous techniques may be used to modify the cladding 1502, including, but not limited to, inclusion of modifications 1504 in the cladding 1502 through which the visible light 106 may be emitted. Introduction of the modifications 1504 decreases the amount of light available for emission of visible light 1302 at the distal end 1400 (e.g., shown at FIG. 14), but allows the visible light 106 to illuminate the cannula hub (e.g., shown on FIG. 14).

FIG. 16 illustrates another example of a cannula that uses an optical fiber for illumination thereof. In the illustrated example, an optical fiber 1100 is coupled to a light source 1200 at a first end and to a cannula 102 at a second end. In the illustrated example, the optical fiber 1100 is coupled to a hub 300, formed at a proximal end 104 of the cannula 102. The optical fiber 1100 transmits visible light 106 generated by the light source 1200 to the cannula 102. The visible light 106 travels from the light source 1200, through the optical fiber 1100, and to the cannula 102. The visible light 106 is conducted to the hub 300 of the cannula 102 and is emitted therefrom. The emitted visible light 106 may be used to visualize the cannula 102 in a darkened environment, such as an operating room during a surgical procedure.

An illumination probe 1600 is disposed in the cannula 102, and a tip 1602 of the probe 1600 extends from a distal end 304 of the cannula 102. Light is provided to the illumination probe 1600 via an optical fiber 1300. In the example illustrated, the optical fiber 1300 is optically coupled to the light source 1200 such that the light source 1200 provides light to the illumination probe 1600. However, in other implementations, a light source separate from light source 1200 may be used to provide light to the illumination probe 1600. In still other instances, the illumination probe 1600 may generate light internally. As illustrated, visible light 1302 provided by the light source 1200 and transmitted along the optical fiber 1300 is emitted from the tip 1602.

Figure 17:
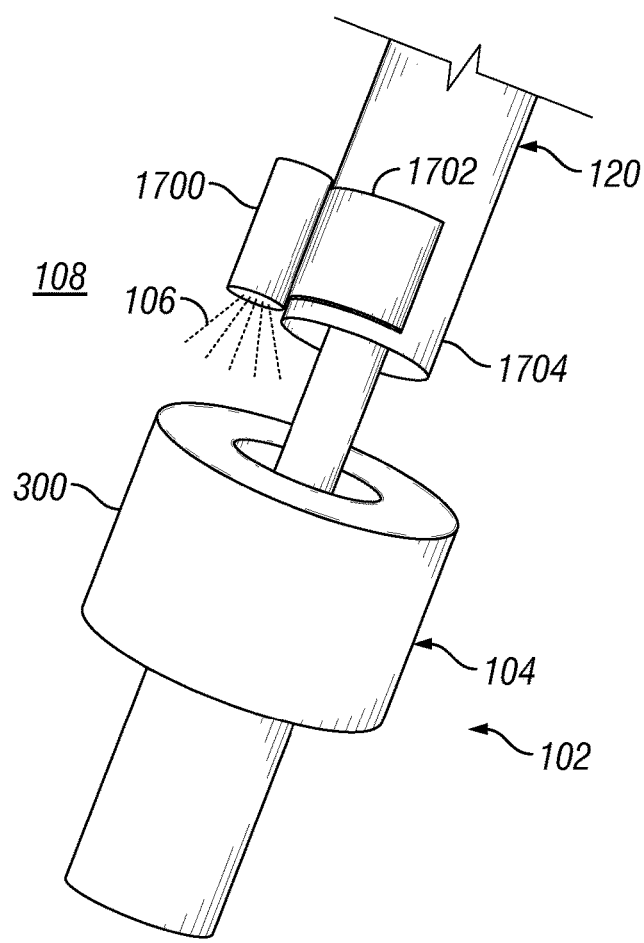
FIG. 17 illustrates another example of a cannula with illumination, wherein a surgical instrument includes a light to illuminate a cannula.

FIG. 17 illustrates another example for illumination of a cannula 102. As shown, a surgical instrument 120 shown inserted into the cannula 102 includes a light source 1700. The light source 1700 emits visible light 106 for illumination of the proximal end 104 of the cannula 102. The visible light 106 allows visualization of the cannula hub 300, formed at the proximal end 104, such as in a darkened environment, such as operating room environment 108. The light source 1700 may be any light source, including, but not limited to, an incandescence lamp, a light-emitting diode, or a laser. The light source 1700 may be attached to the surgical instrument 120 in any number of ways, including, but not limited to, mechanical fasteners, adhesives, magnets, an interlocking feature, a threaded connection, etc. In the illustrated example, a clamp 1702 secures the light source 1700 to a portion of the surgical instrument 120. As particularly shown, the clamp 1702 secures the light source 1700 to a handle 1704 of the surgical instrument 120. While not shown, the light source 1700 may alternatively be integrated into the surgical instrument 120. The surgical instrument 120 may be any instrument for use in a surgical procedure, including, but not limited to, an ophthalmic endoilluminator, a vitrectomy probe, forceps, scissors, backflush, soft tip cannula, pic, an irrigation handpiece, an aspiration handpiece, an integrated irrigation and aspiration handpiece, and scraper, among others.

Figure 18:
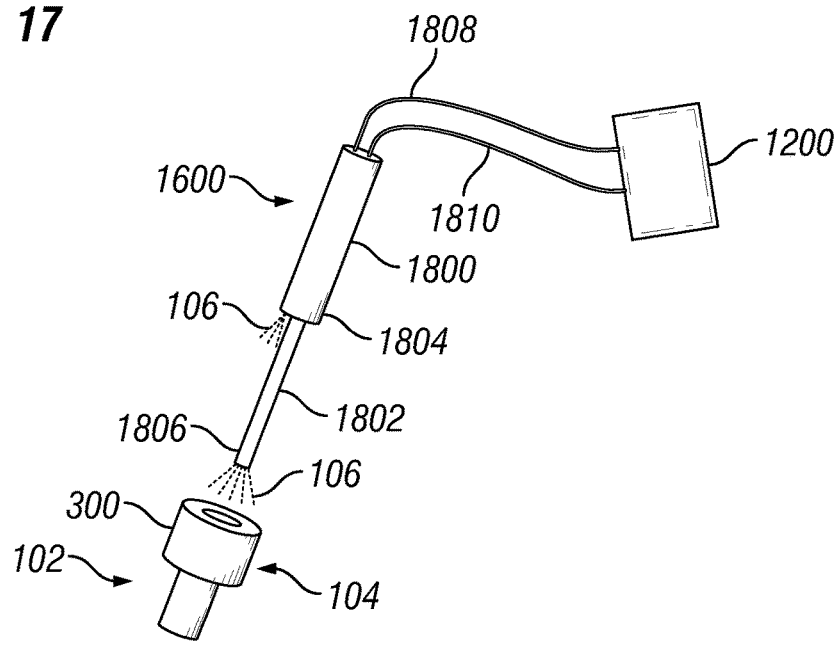
FIG. 18 illustrates another example of a cannula with illumination, wherein a surgical instrument includes a light to illuminate a cannula.

FIG. 18 illustrates another example for illumination of a cannula 102. In the illustrated example, an illumination probe 1600, such as an endoilluminator, emits visible light 106, a portion of which is used to illuminate the proximal end 104 of the cannula 102. The illumination probe 1600 includes a handle 1800 and a sleeve 1802. The sleeve 1802 extends from a distal end 1804 of the handle 1800 to a distal end 1806 of the sleeve 1802. The visible light 106 is emitted from distal end 1806 of the sleeve 1802. The visible light 106 is also emitted from distal end 1804 of the handle 1800 and received by the hub 300 of the cannula 102. With the illumination probe 1600 fully inserted into the cannula 102 such that the distal end 1804 of the handle 1800 abuts the hub 300 of the cannula, the visible light 106 emitted from the distal end 1804 of the handle 1800 is received by the hub 300 and emitted therefrom.

A light source 1200 produces the visible light 106 that is emitted by the illumination probe 1600. In the illustrated example, a first optical fiber 1808 is optically coupled the light source 1200 at a first end of the first optical fiber 1808 and to the illumination probe 1600 at a second end of the first optical fiber 1808. Light transmitted to the illumination probe 1600 via the first optical fiber 1808 provides light that is ultimately emitted from the distal end 1806 of the sleeve 1802. A second optical fiber 1810 is optically coupled to the light source 1200 at a first end of the optical fiber 1810 and optically coupled to the illumination 1600 at a second end of the second optical fiber 1810. The second optical fiber 1810 transmits light produced by light source 1200 that is ultimately emitted from the distal end 1804 of the handle 1800. Although FIG. 18 shows a single light source 1200 that provides light to both the first optical fiber 1808 and the second optical fiber 1810, other implementations may include separate light sources, one of the separate light sources to provide light to the first optical fiber 1808 and a second light source to provide light to the second optical fiber 1810.

Figure 19:
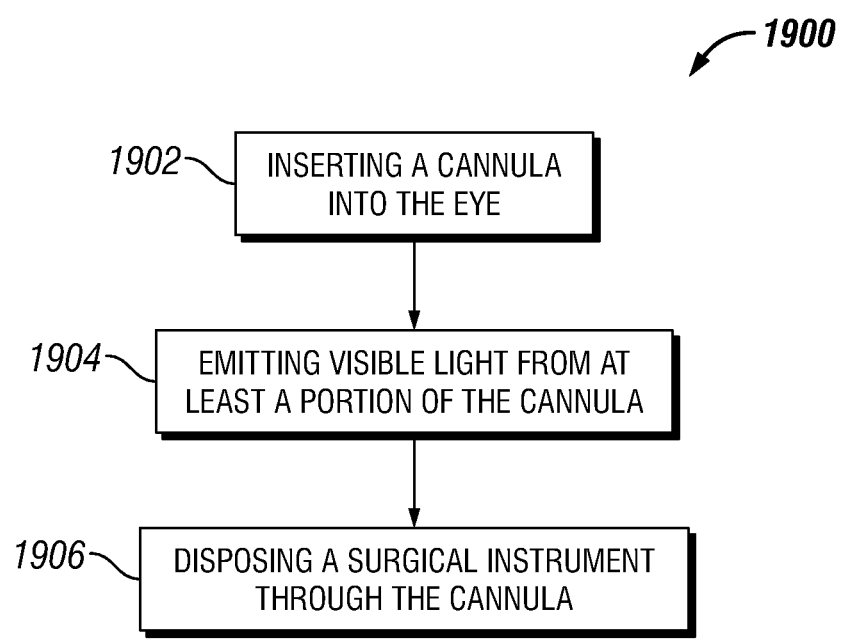
FIG. 19 is an example method of providing a cannula for use in a surgical procedure, the cannula being operable to emit visible light.

FIG. 19 is an example method 1900 for providing a cannula for use in a surgical procedure that is operable to emit visible light. The method 1900 includes inserting a cannula into an eye at 1902. The cannula may be of a type as described herein, such as, for example, any of the cannulas 102 described herein. At 1904, the cannula emits visible light from at least a portion of the cannula. The visible light may be produced by a luminescent material that is disposed in, disposed on, or otherwise contained within a portion of the cannula, such as, for example, a luminescent material of a type described herein or otherwise operable to emit visible light. In other instance, the visible light may be produced remotely from the cannula but transported to a portion of the cannula where the visible light is emitted from at least a portion of the cannula. At 1906, the method 1900 also includes disposing a surgical instrument through the cannula.

The method 1900 may include additional or different steps than those described. For example, the method 1900 may include a step of visually identifying the cannula with the aid of the emitted visible light. A step may also include reducing an ambient light level within an operating environment in which the cannula is located, e.g., a surgical environment. Another step may include utilizing the surgical instrument disposed within the cannula to perform a surgical procedure or portion thereof.

It is believed that the operation and construction of the present disclosure will be apparent from the foregoing description. While the present disclosure presents apparatus and methods shown and described herein, various changes and modifications may be made therein without departing from the spirit and scope of the disclosure.

What is claimed is:

1. An illuminated cannula system comprising:
   an instrument, the instrument comprising:
   a handle; and
   a sleeve extending from a distal end of the handle;
   a light source coupled to the instrument and configured to generate visible light, wherein the instrument is operable to emit the visible light from a distal end of the sleeve and from the distal end of the handle; and
   a cannula comprising:
   a cannula hub disposed at a proximal end of the cannula and operable to transmit the visible light emitted from the distal end of the handle of the instrument when the instrument is inserted into the cannula, wherein the transmission of the visible light by the cannula hub illuminates the cannula hub; and
   a tube portion extending from the cannula hub towards a distal end of the cannula, wherein a distal end of the sleeve extends beyond the distal end of the cannula when the instrument is fully inserted into the cannula.

2. The illuminated cannula system of claim 1, wherein the light source is an optical fiber coupled to the instrument, wherein the optical fiber optically couples to the cannula hub when the instrument is inserted into the cannula.

3. The illuminated cannula system of claim 1, wherein the light source is an incandescent lamp, light emitting diode, or laser.

4. The illuminated cannula system of claim 1, wherein the light source is coupled to the instrument through a mechanical fastener.

5. The illuminated cannula system of claim 1, wherein the light source is coupled to the instrument through an adhesive.

6. The illuminated cannula system of claim 1, wherein the light source is coupled to the instrument through an interlocking feature.

7. The illuminated cannula system of claim 1, wherein the light source is coupled to the instrument through a threaded connection.

8. The illuminated cannula system of claim 1, wherein the light source is coupled to the instrument through a magnet.

9. The illuminated cannula system of claim 1, wherein the light source is coupled to the instrument through a clamp.

10. The illuminated cannula system of claim 1, wherein the light source is integrated into the instrument.

11. The illuminated cannula system of claim 1, wherein the instrument is a vitrectomy probe.

12. The illuminated cannula system of claim 1, wherein the instrument is a forceps, scissors, back-flush, soft tip cannula, scraper, or pic.

13. The illuminated cannula system of claim 1, wherein the instrument is an irrigation handpiece or an aspiration handpiece.

14. The illuminated cannula system of claim 1, wherein the instrument is an endoilluminator.

15. The illuminated cannula system of claim 1, wherein the cannula further comprises a lumen extending along a longitudinal axis of the cannula, and wherein the system further comprising a trocar comprising:
    a shaft portion; and
    a blade portion wherein the trocar is configured to be receivable into the lumen such that the blade portion of the trocar extends distally from the tube portion of the cannula.

16. A surgical system comprising:
    a surgical console;
    an instrument coupled to the surgical console, comprising:
    a handle; and
    a sleeve extending from a distal end of the handle;
    a microscope communicatively coupled to the surgical console;
    a light source coupled to the instrument and configured to generate visible light, wherein the instrument is operable to emit the visible light from a distal end of the sleeve and from the distal end of the handle; and a cannula operable to emit visible light, the cannula comprising:
  a cannula hub disposed at a proximal end of the cannula and operable to transmit the visible light emitted from the distal end of the handle of the instrument when the instrument is inserted into the cannula, wherein the transmission of the visible light by the cannula hub illuminates the cannula hub; and
  a tube portion that extends from the cannula hub towards a distal end of the cannula, wherein a distal end of the sleeve extends beyond the distal end of the cannula when the instrument is fully inserted into the cannula.

17. The surgical system of claim 16, wherein the surgical console comprises the light source and wherein an optical fiber coupled to the instrument is operable to carry the visible light from the light source to the cannula.

18. The surgical system of claim 17, wherein the light source is coupled to the instrument through a mechanical fastener, an adhesive, an interlocking feature, a threaded connection, a magnet, or a clamp.

19. The surgical system of claim 17, wherein the instrument is a vitrectomy probe, a forceps, scissors, back-flush, soft tip cannula, scraper, or pic, an irrigation handpiece, an aspiration handpiece, or an endoilluminator.

20. An illuminated cannula system, comprising:
an instrument, the instrument comprising:
  a handle; and
  a sleeve extending from a distal end of the handle;
a first light source coupled to the instrument and configured to generate light through a first optical fiber, wherein the instrument is operable to emit visible light from the first light source from a distal end of the sleeve;
a second light source coupled to the instrument and configured to generate light through a second optical fiber, wherein the instrument is operable to emit visible light from the second light source from the distal end of the handle; and
a cannula, comprising:
  a cannula hub disposed at a proximal end of the cannula and operable to transmit the visible light emitted from the second light source when the instrument is inserted into the cannula, wherein the transmission of the visible light by the cannula hub illuminates the cannula hub; and
  a tube portion extending from the cannula hub toward the distal end of the cannula, wherein a distal end of the sleeve extends beyond the distal end of the cannula when the instrument is fully inserted into the cannula.

21. The illuminated cannula system of claim 20, wherein the first and second light sources are an incandescent lamp, light emitting diode, or laser.

22. The illuminated cannula system of claim 20, wherein the first and second light sources are integrated into the instrument.

23. The illuminated cannula system of claim 20, wherein the instrument is an endoilluminator.

* * * * *